US012715548B2

(12) United States Patent
Haavikko et al.

(10) Patent No.: US 12,715,548 B2
(45) Date of Patent: Aug. 25, 2026

(54) FRONT SUSPENSION FOR AN ELECTRIC SNOWMOBILE

(71) Applicant: AURORA POWERTRAINS OY, Rovaniemi (FI)

(72) Inventors: Olli Haavikko, Sinettä (FI); Matti Autioniemi, Rovaniemi (FI); Jori-Jaakko Niskanen, Rovaniemi (FI)

(73) Assignee: AURORA POWERTRAINS OY, Rovaniemi (FI)

( * ) Notice: Subject to any disclaimer, the term of this patent is extended or adjusted under 35 U.S.C. 154(b) by 295 days.

(21) Appl. No.: 18/708,556

(22) PCT Filed: Nov. 4, 2022

(86) PCT No.: PCT/FI2022/050727

§ 371 (c)(1),
(2) Date: May 8, 2024

(87) PCT Pub. No.: WO2023/079215

PCT Pub. Date: May 11, 2023

(65) Prior Publication Data

US 2025/0002116 A1 Jan. 2, 2025

(30) Foreign Application Priority Data

Nov. 8, 2021 (FI) ..................................... 20216150

(51) Int. Cl.
*B62M 27/02* (2006.01)

(52) U.S. Cl.
CPC ....... *B62M 27/02* (2013.01); *B62M 2027/026* (2013.01)

(58) Field of Classification Search
CPC .. B62M 27/02; B62M 2027/026; B62B 17/04
See application file for complete search history.

(56) References Cited

U.S. PATENT DOCUMENTS

| | | | | |
|---|---|---|---|---|
| 5,503,242 | A | 4/1996 | Jeffers | |
| 8,827,291 | B2 * | 9/2014 | Cronquist | B62B 17/04 280/124.16 |

(Continued)

FOREIGN PATENT DOCUMENTS

| | | | |
|---|---|---|---|
| CA | 2478003 | A1 | 2/2005 |
| EP | 1798081 | A1 | 6/2007 |

(Continued)

OTHER PUBLICATIONS

International Preliminary Report on Patentability received for PCT Application No. PCT/FI2022/050727 on Oct. 10, 2023, 37 pgs.

(Continued)

*Primary Examiner* — Kevin Hurley
(74) *Attorney, Agent, or Firm* — Merchant & Gould P.C.

(57) ABSTRACT

Front shock absorbers and related support (i.e. suspension) structures are within the frame of an electric snowmobile. The structure includes upper and lower suspension A-arms and a spindle for both skis. A rear connection point for the lower suspension A-arm is placed more to the rear within the frame. The length of the front shock absorbers is designed to be larger. This configuration is possible because of more space available in the electrically driven snowmobile. The caster (β) and camber (α) angles may be kept as constant during any compression magnitude of the front shock absorbers.

7 Claims, 8 Drawing Sheets

(56) References Cited

U.S. PATENT DOCUMENTS

| | | | |
|---|---|---|---|
| 9,051,027 B1 | 6/2015 | Vezina | |
| 9,327,789 B1 | 5/2016 | Vezina | |
| 2008/0173491 A1 | 7/2008 | Fecteau | |
| 2015/0060159 A1 | 3/2015 | Sawai | |
| 2017/0305500 A1 | 10/2017 | Vigen | |
| 2024/0149977 A1* | 5/2024 | Schroeder | B62M 27/02 |
| 2025/0092849 A1* | 3/2025 | Bedard | B62D 55/07 |

FOREIGN PATENT DOCUMENTS

| | | |
|---|---|---|
| FI | 20175471 A | 11/2018 |
| WO | 2021084520 A2 | 5/2021 |

OTHER PUBLICATIONS

Finnish Search Report received for FI Application No. 20216150 on May 20, 2022, 1 pg.
International Search Report and Written Opinion received for PCT Application No. PCT/FI2022/050727 on Feb. 3, 2023, 10 pgs.

* cited by examiner

FRONT SUSPENSION FOR AN ELECTRIC SNOWMOBILE

CROSS-REFERENCE TO RELATED APPLICATIONS

This application is a National Stage Application of PCT/FI2022/050727, filed Nov. 4, 2022, which claims priority to application No. 20216150, filed Nov. 8, 2021 in Finland, and which applications are incorporated herein by reference. To the extent appropriate, a claim of priority is made to each of the above-disclosed applications.

TECHNICAL FIELD

The present invention relates to snowmobiles and especially electrically driven snowmobiles. In more detail, the present invention relates to front suspension structures of the electrically driven snowmobiles.

BACKGROUND

A snowmobile is a vehicle for winter transport even in rural forest-dominating terrains and also for recreational activities when there is enough snow present for the vehicle. Traditionally snowmobiles have been using internal combustion engines as their power source, which makes sure that the travelling range is long enough even in rural and remote areas. This is also a safety matter.

Snowmobiles have a rather large rolling resistance, which correlates strongly to their relatively large consumption of power. Therefore, traditional snowmobiles with internal combustion engines have consumed rather large amount of fuel/100 km. This becomes a safety issue in the wilderness, as there thus emerges a need for larger fuel tanks (or well-planned locations for refueling), which would further affect the drivability through excess weight on the vehicle. Thus, there has been some research to get rid of the power systems revolving around internal combustion engines; also because of the environmental reasons and trends.

Electrically driven snowmobiles have already been presented, e.g. in patent application publication FI 20175471, but the concept is pretty new and applied quite marginally currently in the snowmobile industry. However, the interest towards designing environmentally friendly and also quieter options for transport in the wilderness has been large, and in the future, these aspects most likely will become even more relevant for the customers and manufacturers.

The snowmobile is constructed around and within a specifically designed frame. Such a frame has many practical requirements, such as robustness, endurability against (almost continuous) shocks and impacts, and endurability also in winter conditions. Still, a certain lightness is good in order to have good maneuverability for the driver, and on the other hand, the location or height of the driver (i.e. the driver seat height) affects this as well, and also the centre of gravity is usually desired to be locating in a quite low position.

A prior art snowmobile from the early 2000's involves a profile-structured upper part of the frame, a so-called "pyramid structure", which also enables a stiffer solution compared to the earlier ones. The pyramid structure comprises a first A-shaped element giving support towards/from the front part of the frame, a second A-shaped element giving support towards/from the middle part of the frame, and a third A-shaped element giving support towards/from the rear part of the frame. The shock absorbers of the skis are attached from their upper ends to the lower part of the front-most A-shaped element. The impulse-typed forces hitting the skis and propagating towards and along the shock absorbers, will transfer via the front-most A-shaped element towards the top of the pyramid structure. From there, the forces will distribute via the central and rear A-shaped elements to the lower part of the frame.

As FI 20175471 discloses, the drive system of a new electric snowmobile or a converted electric snowmobile (from the one applying internal combustion engine) may comprise a primary driving axis, a gear mechanism, a drive axle, and an endless drive track rotating in contact with the snow below. The reference comprises an electric motor, which is placed within the frame, where the connection of the motor can be made via a connecting adapter. The connecting adapter comprises intrinsic flow channels designed for a cooling air or liquid, in order to direct excessive heat away from the electric motor.

US 2008/0173491 ("Fecteau") discloses a front suspension for a snowmobile. This is a double A-arm structure, comprising an upper A-arm, a lower A-arm and a spindle connecting these two A-arms to the respective ski. The connection of these A-arms to the spindle defines a caster angle. The upper and lower A-arms are connected to a front portion of a frame so that the caster angle will decrease when the front suspension is compressed during driving in rough terrain. Fecteau's suspension travel distance vertically is defined to be preferably approximately between 20 . . . 30 cm (between 8 . . . 12 inches). Fecteau is all about an internal combustion engine driven snowmobile, and there are no mentions whatsoever towards electric motors or battery compartments as the snowmobile's power source.

CA 2478003 ("Väisänen") discloses a front suspension for a snowmobile as well. This structure comprises a lower A-arm assembly and an upper suspension arm for connecting each front ski to the chassis of the snowmobile. The purpose of the lower A-arm assembly is to restrain the front ski from moving backward or in a lateral direction. The upper suspension arm is designed to connect to the top of a spindle which ensures that the spindle (i.e. element 34) will remain substantially vertical when the front ski encounters a bump. A shock absorber assembly (i.e. element 26) comprises a spring structure and it is aligned in a slightly tilted angle from the vertical direction as FIG. 6 in a top plan view illustrates. Väisänen is all about an internal combustion engine driven snowmobile (see par. [0003], line 3), and there are no mentions whatsoever towards electric motors or battery compartments as the snowmobile's power source.

EP 1798081 ("Tonoli") discloses a vehicle with tilting suspension system. This tilting action happens when the surface underneath the skis are on a different level or if the surface plane is not exactly horizontal. Shock absorbers are also part of the structure of the vehicle. Four A-arms connect the skis to the rest of the frame.

U.S. Pat. No. 9,327,789 ("Vezina") discloses a leaning vehicle, which has very good leaning properties as FIG. 22 illustrates. The arms connecting the skis to the other parts of the frame are not all straight rods. Furthermore, the upper connection points ("340") of the two shock absorbers onto the frame are not the same as FIG. 20 for instance shows.

U.S. Pat. No. 5,503,242 ("Jeffers") discloses a propeller driven snow buggy. Rather narrowly shaped A-arms are used, and their central axes for all four A-arms (14, 16) are parallel. The connection point of each rod of the A-arms to the frame is on the side edge of the vehicle. There is no endless belt, or a roller tunnel, as this vehicle works with propels.

US 2017/0305500 ("Vigen") discloses a spindle and suspension system for recreational vehicles, such as snowmobiles. The structure connecting the skis to the rest of the frame is made of rods which mostly have parallelly directed sections. The front section of each ski forms a loopshaped design. Shock absorbers and the endless belt are part of the concept in a rather traditional fashion. The scope focuses especially on the spindle and the suspension system but also on the whole vehicle.

The prior art has several problems relating to front shock absorbers and their connecting points within the frame. As the prior art involves internal combustion engines, and additional parts required because of that technique, there are more restrictions in the freedom of the design for the snowmobiles. This means less available space, or otherwise the aerodynamical properties would suffer. This space-related deficiency is present currently by looking at the available distance for the shock absorbers e.g. in FIG. 7 of Väisänen. Because the main front body of the chassis reaches to the very front (see FIGS. 1 and 4 of Väisänen; also FIG. 1 of Fecteau), there is a rather small distance available vertically for the front shock absorbers. Therefore, the effective length of the shock absorber during maximum compression is rather short in prior art.

Also in prior art applying an internal combustion engine, the lower A-support rod and its more rear connection point to the frame, needs to be connected quite in front because the front part of the chassis is filled with parts and technique required there. Therefore, the currently placed rear connection points of the lower A-support rods are not optimal, when concerning strength or endurance optimisation of the frame structure concerning electric snowmobiles. The connection points locate usually 15-25 cm in front of the location where the front end of the roller tunnel (i.e. involving the endless drive track) locates, when looking the situation from the top side. This location of the rear connection points for the lower A-shaped rods results in a snowmobile frame which would be less resistant to all types of possible external forces, and it would even result in a snowmobile, whose frame would not tolerate certain external forces and impulses during longer usage periods as well as it should, or as well as it is expected in this field. Thus, this design characteristic is intolerable in electric snowmobiles, if nothing is done to the earlier design.

Because of the restrictions for the lower A-support rods i.e. for the lower suspension A-arms, the prior art design involves different geometries between the upper and the lower suspension A-arms. This is not optimal for proper shock absorbance properties of the snowmobile.

In other words, the forces directed to the frame and chassis are relatively large, if the so-called spindle or the spindle arm (like the vertical element 34 of Väisänen; or element 110 in Fecteau) is relatively short, as is the case in Fecteau and Väisänen, and also in the rest of the traditional snowmobile solutions. And when staying within the internal combustion engines based solutions, the redesign is extremely hard. Besides the engine itself, there are also various gas exchange systems (pipes and sound reduction arrangements, for instance), and the variable ratio transmission system, which are rather large in their size, and they thus create notable restrictions when trying to redesign the frame structure and the shock absorbers of the traditional snowmobile. There are also protective metal and plastic structures around the variable ratio transmission system and around the gas exchange systems, which take their own space. An electric snowmobile is free from these volumetric constraints.

Currently, there has not been presented an efficient, suitable and advantageous design involving shock absorbers, which would have been designed and optimized especially for electrically driven snowmobiles. This is the main problem in the prior art.

SUMMARY

The present invention introduces an electric snowmobile (1) with efficient shock absorbance properties, wherein the electric snowmobile (1) comprises a frame (9), comprising a front part (8) of the frame, which front part (8) of the frame comprises two upper suspension A-arms (5) and two lower suspension A-arms (6).

The electric snowmobile (1) is characterized in that the upper and the lower suspension A-arms (5, 6) locate substantially on top of one another with a mutual distance, with mutually parallel mirroring angles of the A-arms (5, 6), for each pair of upper and lower suspension A-arms (5, 6) for each of the skis, and the electric snowmobile (1) further comprising front shock absorbers (4), whose top connection points locate at the same location essentially on a top of an essentially pyramid-shaped structure of the front part (8) of the frame (9).

In an embodiment of the present invention, the front part (8) of the frame (9) comprises a spindle (7) per each ski, which spindle (7) is a relatively long vertical element connected to each of the skis, and where the upper and lower suspension A-arms (5, 6) are fixed to the spindle (7) in their top location of the A-shapes.

In an embodiment of the present invention, the upper left suspension A-arm (5) is fixed to the top of the left spindle (7), the lower left suspension A-arm (6) is fixed to the left spindle (7) so that the mutual distance is larger than the distance from the lower left suspension A-arm's (6) fixation point to a bottom surface of the left ski, and the upper right suspension A-arm (5) is fixed to the top of the right spindle (7), the lower right suspension A-arm (6) is fixed to the right spindle (7) so that the mutual distance is larger than the distance from the lower right suspension A-arm's (6) fixation point to a bottom surface of the right ski.

In an embodiment of the present invention, a rear connection point (13) for the lower suspension A-arm (6) in both the left and right sides locates at or right next to the longitudinal side edge (12) of the roller tunnel, and further, the rear connection point (13) for the lower suspension A-arm (6) in both the left and right sides locates at or close to the lateral vertical plane along the front end (11) of the roller tunnel.

In an embodiment of the present invention, the frame (9) is configured so that:

determining four end points including the two outer ends in each of the upper and lower suspension A-arms (5, 6) in the left side of the snowmobile (1), designing the locations of the four end points so that they define together corners of a rectangle, determining further four end points including the two outer ends in each of the upper and lower suspension A-arms (5, 6) in the right side of the snowmobile (1), designing the locations of the further four end points so that they define together corners of another rectangle.

In an embodiment of the present invention, the snowmobile (1) is configured to obtain a constant or essentially constant camber angle (a) in relation to a vertically locating plane(s) across the whole compression or movement range of the front shock absorbers (4), where the plane(s) locates along the longitudinal central line of the snowmobile (1).

In an embodiment of the present invention, the snowmobile (1) is configured to obtain a constant or essentially constant caster angle (B) in relation to a lateral vertical plane (r) across the whole compression or movement range of the front shock absorbers (4), where the plane (r) locates across the area of the snowmobile (1) where the skis locate.

In an embodiment of the present invention, the electric snowmobile (1) comprises:

- an encapsulating body (2), comprising a part having a hexahedronally shaped inner surface;
- a driver's seat (3) directly installed on top of a central horizontal part of the encapsulating body (2);
- a battery package in the hexahedronally shaped space defined by the part of the encapsulating body (2); and
- one or more vibration isolators (10) configured between the battery package and the encapsulating body (2), for diminishing the effects from outer shocks towards the battery package.

DETAILED DESCRIPTION

The present invention presents a front suspension structure especially suitable for electric snowmobiles. By this we mean physical parts and their mutual connections and design features within the electric snowmobile which relate to mitigating effects of shocks and bumps.

When concerning the electric power transmission and different physical parts and functional entities within a snowmobile, a main problem is the small available space i.e. volume. With internal combustion engines driven snowmobiles, there have been strong restrictions in designing and placing different parts and connection points within the frame in an appropriate manner. For instance, this has led to the front shock absorbing characteristics being not optimal. And for electrically driven snowmobiles, the redesigning work has not really taken place, at least not until now. The present invention redesigns some parts of the electric snowmobile by benefiting from some free space, which is now vacated from some internal combustion engine-based technical parts. Many advantages are made possible with the redesigned solution; see them later.

One main characteristic and trend in this century for the snowmobiles is that created snowmobile designs have enabled the user, i.e. the driver, to sit on the snowmobile like on a motorbike. This is thus more convenient for the driver also during longer rides, as it brings clear improvements in riding ergonomics. This "better-posture" feature was presented for the snowmobiles in the early 2000s. Such a design is now the prevailing solution across various different manufacturers of snowmobiles.

The main purpose in the present invention is to design an electric snowmobile, which has excellent front shock absorbers, and which thus mitigates external bumps and shocks very efficiently.

Next we discuss the main features and details of the present invention by referring to embodiments shown in FIGS. 1-8, and going through them one by one.

Figure 1:
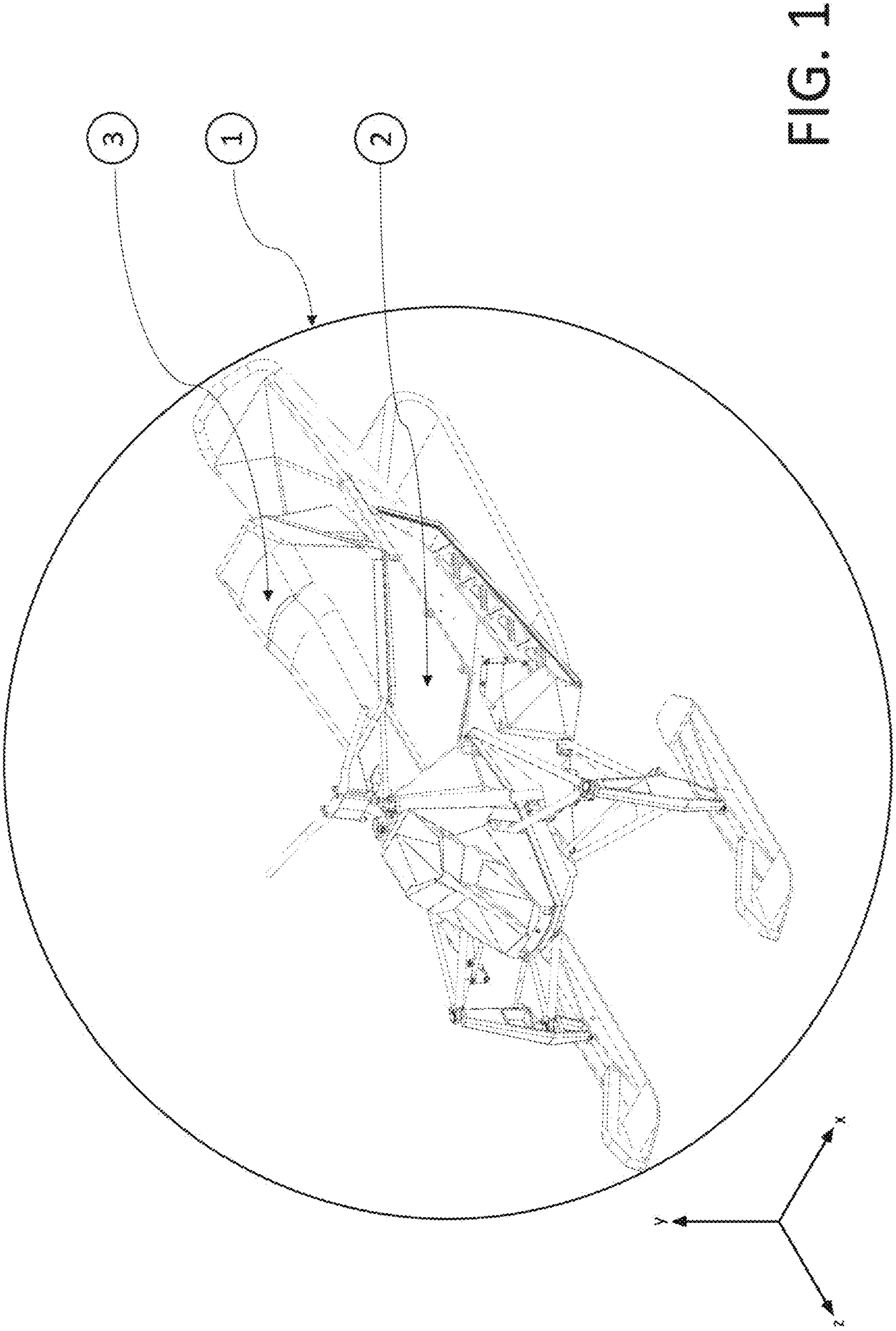
FIG. 1 illustrates an electric snowmobile with a multi-functional frame structure according to an embodiment of the present invention.

FIG. 1 illustrates an electric snowmobile 1 with a multi-functional frame structure according to an embodiment of the present invention. This drawing illustrates the vehicle as a whole, and in a rather general level.

The electric snowmobile 1 comprises an encapsulating body 2 which is a longitudinally placed element. The encapsulating body 2 may also be considered as a cover-like element protecting the electric elements and parts and also power transmission parts within the electric snowmobile 1. Furthermore, the encapsulating body 2 may be made from a metal sheet, which is shaped through folded and twisted parts so that the encapsulating body 2 forms a certain volumetric area meant for the battery package and for other elements such as power transmission elements and other electrical parts, e.g. connecting cablings. In an embodiment, not all the required elements need to locate within the volume defined by the encapsulating body 2, but for instance the battery package and the electric motor may locate within the volume defined by the outer surface of the encapsulating body 2. The encapsulating body 2 may be open from below so that the encapsulating body 2 comprises a "roof-part" and "side-walls-part", bent and formed from a planar metal sheet and possibly with connecting rods or protrusions, to form a structure which may be placed on top of the battery package. Simultaneously, the top surface of the encapsulating body 2 may form a platform, base or surface for the driver's seat 3 to be installed. The driver's seat 3 may comprise foamed plastic, set and attached between a top layer of leather and the top surface of the central part of the encapsulating body 2. Thus, the encapsulating body 2 forms a direct base for the seat 3 of the driver.

The encapsulating body 2 may be manufactured from metal, or from some hard but lighter material which has good endurance against impulse-type of forces and twisting forces, in an embodiment. In another possible embodiment, the encapsulating body 2 is manufactured from metal, or as a composite structure involving metals and/or plastic, or from material capable to bear the forces directed towards the frame 9 and the encapsulating body 2. The encapsulating body 2 may be manufactured as a singular element, or from several separate parts which are attachable together in some way. The snowmobile 1 is prone to experience sudden and also possibly rather large forces, which usually have a force vector having mainly a vertical element, such as when the snowmobile 1 experiences a bump when riding onto an edge of the pothole on the terrain. However, the forces may also have a major horizontal component, when the snowmobile 1 hits a tilted edge of a pothole directing the snowmobile instantly more to left or to right, or when simply the driving action of the user makes a sharp turn for the snowmobile 1. In these varyingly directed external forces, the encapsulating body 2 needs to maintain all the internal elements such as the battery package well in its place, no matter the "quality" of the terrain where the driving takes place. Elastic elements or otherwise vibration-suppressing elements can be placed between the lower surface or the inner side surface of the encapsulating body 2 and the battery package right under or adjacent to it. Thus, the contact between the battery package and the inner surface of the encapsulating body 2 can be made sufficiently good and lasting, no matter the impulse-type of forces present during the driving. Also, any impulse experienced by the elastic or vibration suppressing elements will greatly be absorbed in these intermediate softening elements, reducing strain experienced on the outer walls and surfaces of the battery modules within the battery package.

Comparing to the prior art, the encapsulating body 2 now acts as a support structure which fully replaces the profile-structured pyramid solution with three A-shaped elements (as in prior art). The functions and characteristics enabled by the encapsulating body 2 fully replace the characteristics made possible by the pyramid-solution, and furthermore, the present invention provides an optimized solution for electrically driven snowmobiles, concerning volumetric consumption within the snowmobile's outer housing by different functional entities and structural features. Also in case of constant bumps and impulses experienced by the electric snowmobile 1 during normal driving, the invented structure involving the encapsulating body 2 is well suited to absorb and direct the forces so that the inner parts, such as the battery package, are not physically harmed, or e.g. electrically disconnected, during driving in the harsh conditions. The use of the encapsulating body 2 thus provides advantages over the profile-structured prior art solution.

As an alternative or added functional element concerning shock reductions, there may be specific vibration isolators 10 between the battery package and the frame 9 but these are discussed later in connection with FIG. 2. There may be one or more (e.g. three) vibration isolators 10 installed in the snowmobile 1, for diminishing the effects of vibration onto the battery package. In case of three vibration isolators, the electric snowmobile 1 comprises three locations between the battery package and the frame 9 where the vibration isolators 10 have been placed, for enabling twisting forces onto the frame 9 without creating twisting forces towards the battery package.

Below the encapsulating body 2, there is an endless drive track, which functions as "a driving mat" and as a direct interface between the vehicle itself and the snow surface on the terrain. The power from the electric motor is converted to a rotating movement of the endless drive track.

In the front side of the frame, there are two steerable front skis, which are connected to the front right and front left side of the frame structure. The steering given by the driver via the handle bar of the electric snowmobile transfers to the turning movement of the front skis.

As this is an electric snowmobile, there is no need for any internal combustion engine, or any other part which the internal combustion engine specifically requires. As a main advantage and as a major "green" result, there is no exhaust pipe and thus no harmful emissions to the environment, nor any loud motor sounds created by the internal combustion engine. These aspects make the driving experience very pleasant to the driver.

Figure 2:
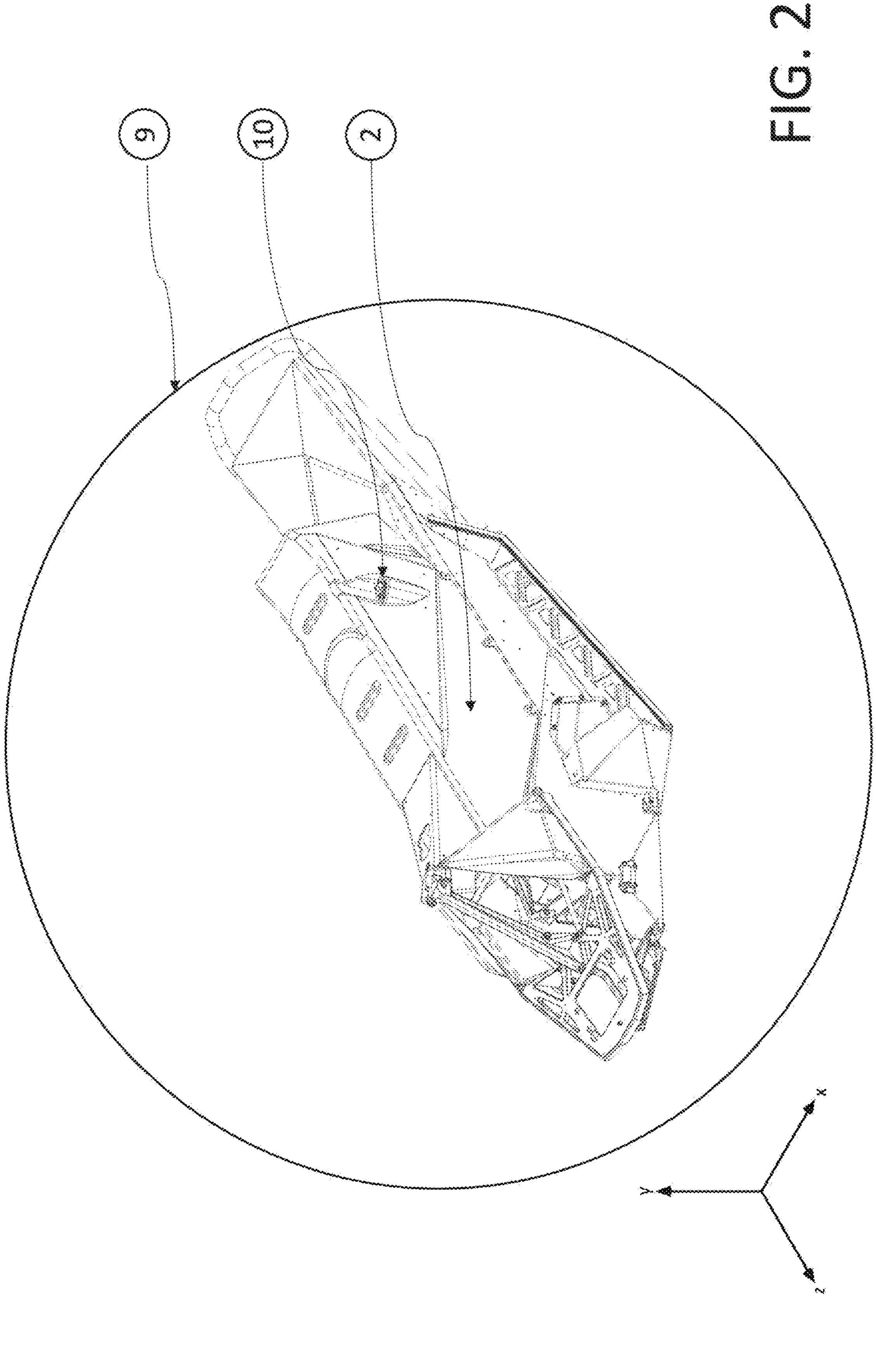
FIG. 2 illustrates the encapsulating body and vibration isolators in more detail.

FIG. 2 illustrates the encapsulating body and vibration isolators of the electric snowmobile in more detail, in an embodiment of the present invention. A major part of the frame 9 is visible and shown from the point of view from the top left of the snowmobile structure. The longer element placed in a longitudinal direction which has a horizontally aligned part in the central area, is the encapsulating body 2, which is also visible partly in FIG. 1. In this embodiment of the present invention, at least one vibration isolator 10 is placed between the battery package (not shown in FIG. 2) and the frame 9, for diminishing the effects of vibration onto the battery package. Furthermore, the electric snowmobile comprises three locations between the battery package and the frame 9 where the vibration isolators 10 have been placed, for enabling twisting forces onto the frame 9 without creating twisting forces towards the battery package. One exemplary location of a vibration isolator 10 is shown in FIG. 2.

Otherwise, concerning the front part 8 of the frame 9, this embodiment may be implemented similarly as shown in FIG. 1 already, and in following FIGS. 3, 4, 7 and 8. The tail end part of the frame 9 can be designed as shown in FIG. 2; this design is also visible in FIG. 1. The illustrated shape however may be varied to some other beneficial shape if desired e.g. for aerodynamical reasons.

The rest of the elements, especially concerning the front part 8 of the frame 9, are discussed in connection with the following Figures in more detail.

Figure 3:
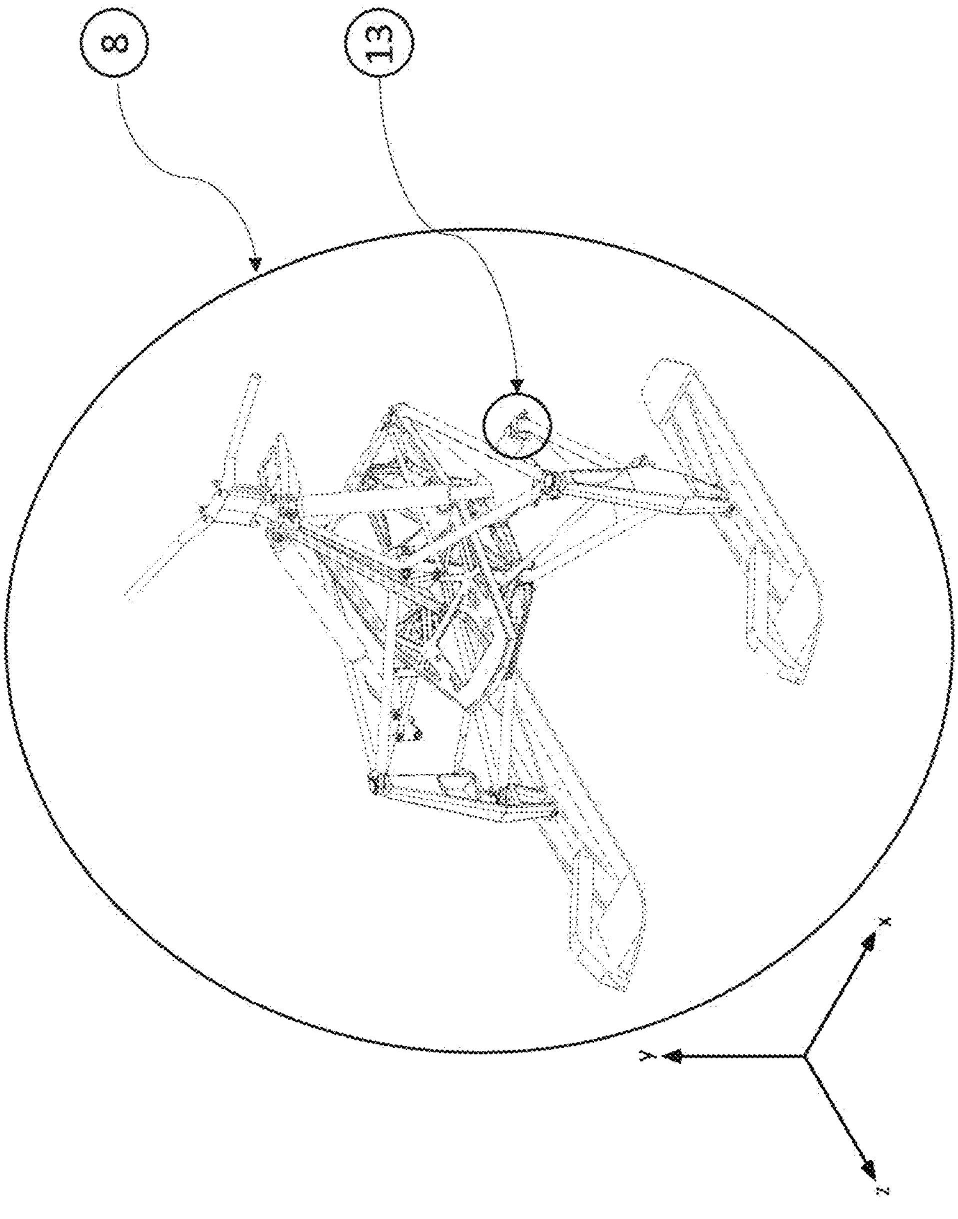
FIG. 3 illustrates a front part of the frame of the multi-functional frame structure in more detail.

FIG. 3 illustrates a front part 8 of the frame 9 in the multifunctional frame structure of the snowmobile 1 in more detail.

FIG. 3 shows a general structure of the front part 8 of the frame 9, as separated from the rest of the electric vehicle. Front skis make the contact to the snow, and the front skis are connected by mainly vertically aligned rods, i.e. by a left and right spindle 7 to two A-shaped rod structures (i.e. A-arms 5, 6). Two front shock absorbers can be seen as the two thicker rod-shaped elements in a tilted alignment angle near the handle bar in the top of the device. A rear connection point 13 for lower suspension A-arm is marked in FIG. 3. This is the element whose location may now be especially changed compared to the prior art solutions (=the internal combustion engine-based snowmobiles). By location, it is especially meant the longitudinal placement of the rear connection point 13 within the frame 9 of the electric snowmobile 1 in view of the front end of the roller tunnel 11; see also FIGS. 4, 5 and 6 for further views of the arrangement, and concerning some of the referred elements. The rest of the connecting rods (like the ones forming the A-arms 5, 6) and their mutual arrangement within the multifunctional frame structure are explained in connection with FIG. 4.

Figure 4:
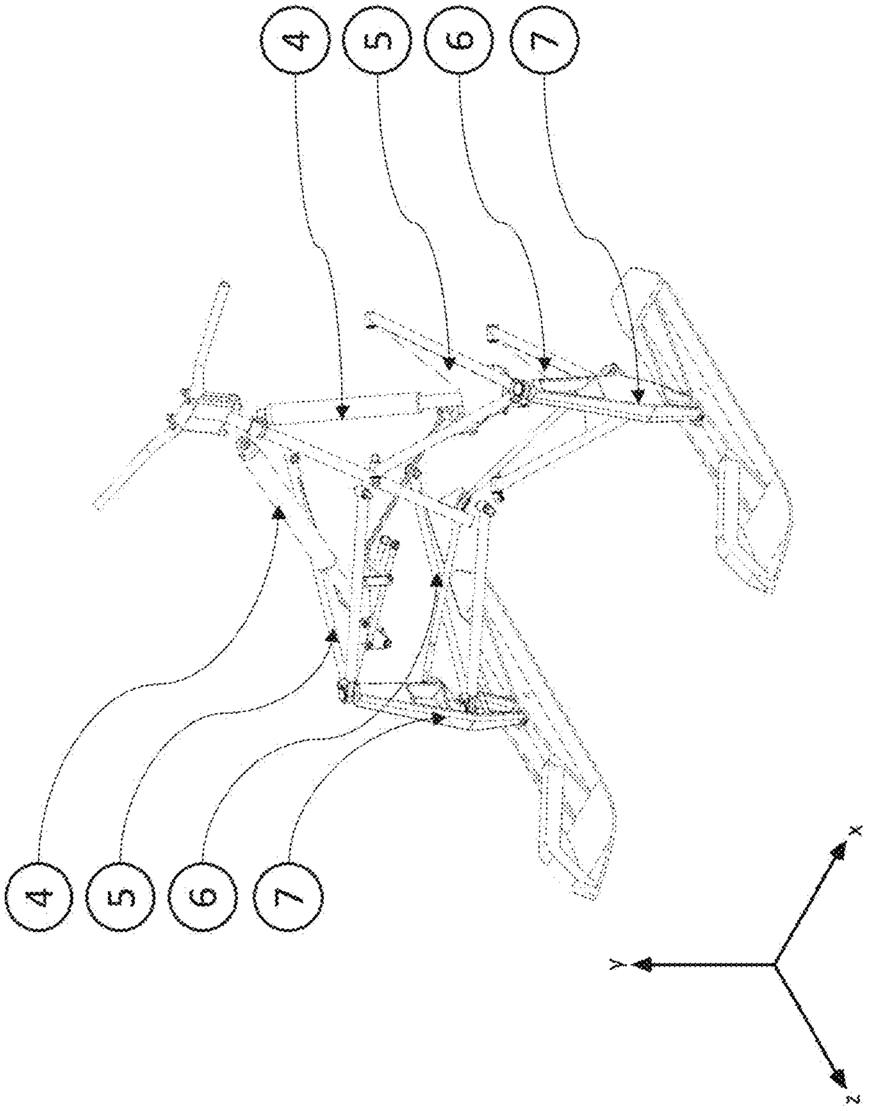
FIG. 4 illustrates a front part of the frame of the multi-functional frame structure also in more detail, highlighting various elements of the front part.

FIG. 4 illustrates the front part of the frame in the multifunctional frame structure of the snowmobile also in more detail, but now highlighting various elements of the front part. Two front shock absorbers 4 can be seen as the two thicker rod-shaped elements in a tilted alignment angle near the handle bar in the top of the vehicle structure. Front skis are the lowermost elements making the contact to the snow, and the front skis are connected by mainly vertically aligned rods, i.e. by a left and right spindle 7 to two A-shaped rod structures (i.e. the lower and upper suspension A-arms 6, 5). The spindle 7 may also be called as a ski leg. The lower suspension A-arms 6 are placed substantially along a horizontal direction. The top point of the A-shape is connected to either the left or right spindle 7 (which locates substantially vertically, sticking up from either the left or right front ski). One branch of the lower left A-shaped element (i.e. half of the respective A-arm 6) is connected to one branch of the lower right A-shaped element (i.e. "mirroring" half of the respective A-arm 6) and the rest of the frame 9, near or at the central longitudinal axis of the vehicle. The connection point can be seen in FIG. 4 as the low central connection point (i.e. a first common connection point), where five rods depart from nearly the same connection point, in an embodiment. In a further embodiment, there can be five rods connected together directly, or via shaped forms/elements in connection with rods, or via some intermediate connection elements or attachment tools (screws etc.) connecting the lower suspension A-arms 6 firmly to the rest of the frame 9.

In an embodiment, both branches (of the element 6) starting from the A-shaped top location within either on the left or right spindle 7, will connect to the outer surface of the encapsulating body 2 in the branch's outer end. This can be seen especially in FIG. 1. This connection makes the structure more robust and endurable.

The top ends of the left and right spindle 7 are where the upper suspension A-arms 5 are connected. The alignment of these A-shaped elements are principally the same as for the lower suspension A-arms 6. Thus, summarizing this structure, in the left hand side there are two A-shaped elements right on top of one another in a similar angular position, and the same applies for the right-hand side as well. Also the upper suspension A-arms 5 will connect together via one of their branches (see FIG. 4), in a second common connection point. Concerning this central axial line in a longitudinal direction of the vehicle, the mutual connection points (i.e. the first and second common connection points) of the lower and upper suspension A-arms 6, 5 will locate along this central axial line, in different heights. As a different physical element, a steering column is connected directly to the handle bar of the electric snowmobile 1.

There are two front shock absorbers 4 in an embodiment, which are connected in their lower ends to a respective intermediate element, which in turn are connected to a respective upper suspension A-arm 5. Furthermore, the two front shock absorbers 4 are further attached right below the handle bar from their upper ends, where the attachment point near the handle bar locates thus in a vertically higher position than the two intermediate elements. The attachment points of the front shock absorbers 4 are selected so that the alignment of the front shock absorbers 4 forms a tilted and symmetric arrangement, as FIG. 4 illustrates. This structure enables good shock absorption capabilities in case of impulse-like forces and shocks experienced by the electric snowmobile in a bumpy terrain.

The handle bar in the top of the vehicle thus experiences dampened impulses and mitigated shocks during the driving, and the vertical distance from the handle bar's level of the electric snowmobile to the level of the front skis will oscillate between certain limit values, based on experienced pits and potholes, and other hits created by the surrounding terrain during driving.

Controlling electric cablings or wirings are not visible in FIG. 4.

The illustrated frame structure creates many advantages. It is light, and enables an improved riding ergonomics for the driver because of the frame's outer design. It is also robust and enduring during harsh outdoor environments, involving not only bumpy conditions, but also very cold conditions. There is good dampening characteristics for outside forces and impulses, making the driving more pleasurable for the driver. The design offers a driving position, which resembles a driving position made possible by current motorbikes. Also, the space which has been occupied by various parts required in the internal combustion engine-based snowmobiles, are now vacated in the electric snowmobile solution, and this free space is now well used in redesigning some shapes and alignment angles of the various features of the frame structure. Therefore, it can be said that the presented design has been really optimized for the electric snowmobile, and maybe for the first time during the development history of electrically driven snowmobiles.

Figure 5:
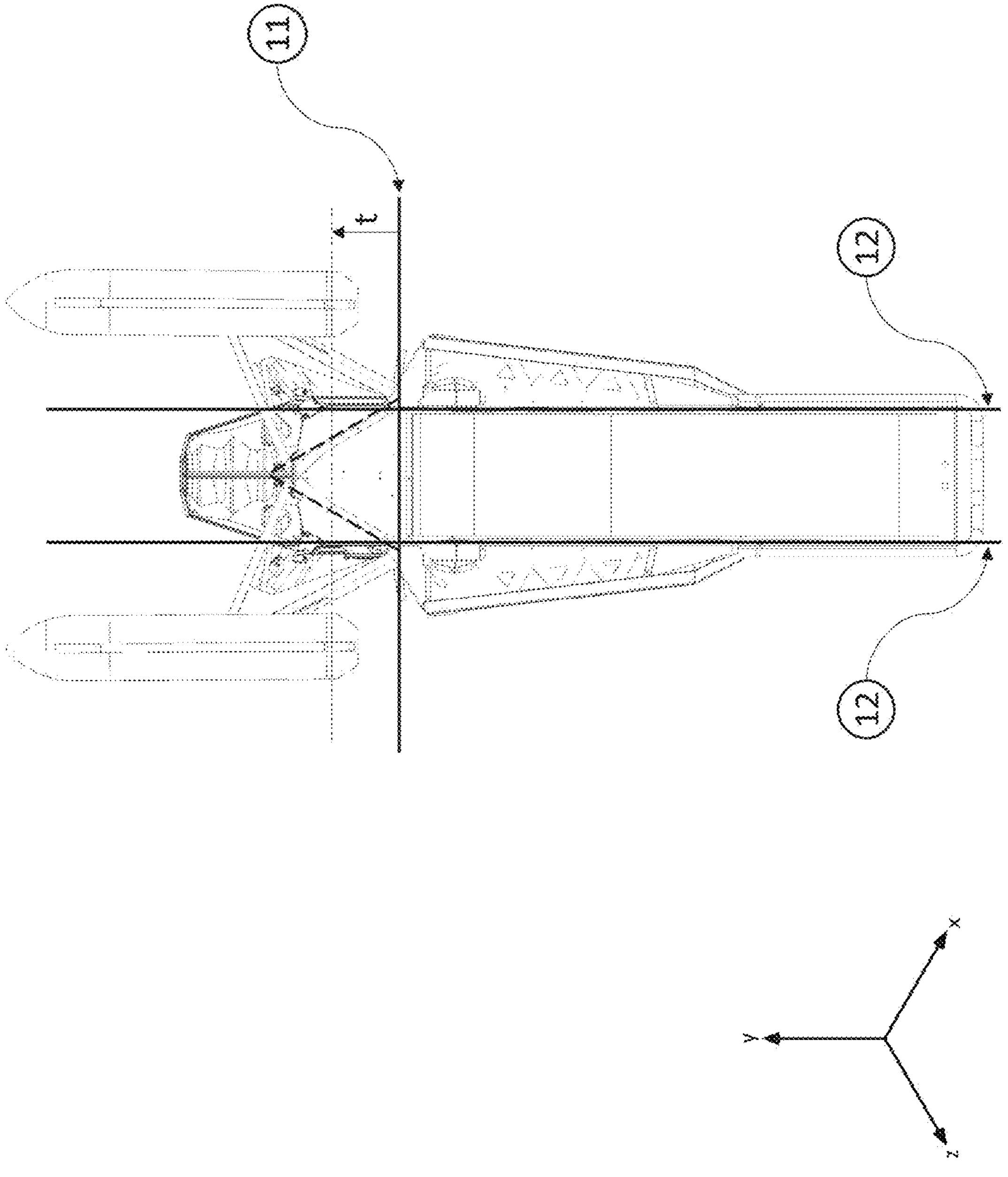
FIG. 5 illustrates certain dimensional features concerning the front end of the roller tunnel and the rear connection point for the lower suspension A-arm, in the present invention.

FIG. 5 illustrates certain dimensional features concerning the front end of the roller tunnel 11 and the rear connection point 13 for the lower suspension A-arm 6, in the present invention. Now it is possible to design the frame 9 and the A-arms 5, 6 so that rear connection point 13 for lower suspension A-arm 6 is obtained more towards the rear of the snowmobile frame 9. The solution applied here for the electric snowmobile 1 can be seen in FIG. 5. In prior art discussed in the background, the connection points locate usually 15-25 cm in front of the location where the front end of the roller tunnel 11 (i.e. involving the endless drive track) locates, when looking the situation from the top side of the snowmobile 1. However, in the present invention, the rear connection points 13 for the lower suspension A-arms 6, may be placed close or very close to the front end of the roller tunnel 11; meaning the same as "close or very close to the lateral vertical plane along the line 11 in FIG. 5". This lateral, vertical plane is marked right at the front end of the roller tunnel 11. The prior art's rear connection points locate along the thin dashed line, while the present invention's rear connection points 13 locate along or near the thick horizontal (=the direction in this figure) intact line i.e. line 11. The rear connection point 13 can be seen in the figure near the intersection of the thick intact lines; applying to both connection points 13, respectively. The difference in the longitudinal placement (between prior art and the invention) is marked as "t"; shown in FIG. 5 between the horizontal intact and dashed lines. Indeed, because the snowmobile 1 according to the present invention now has more free space right in front of the roller tunnel (also laterally), the rear connection point 13 (where the more rear half (i.e. the lower locating rod in the point of view of this figure) of the A-arm intersects with a thicker dashed line) will locate right next to the lower corner of the roller tunnel. This optimal rear connection point 13 thus locates at or right next or adjacent to the longitudinal side edge 12 of the roller tunnel (see the longitudinally directed two thick intact lines in FIG. 5; the symmetrically drawn vertically aligned lines in FIG. 5). Also, this location of rear connection point 13 is at or close to the longitudinal level shown as line 11, i.e. the front end of the roller tunnel 11 (as also mentioned earlier). The tilted thick dashed lines on top of the part of the frame 9 depict the structural design of the frame 9 so that the impacts through the lower suspension A-arms 6 to frame 9 are partly carried by the triangular forming of the frame 9 consisting of the tilted thick lines and the thick intact line. The A-arms 5, 6 and the pyramid-shape structure (shown especially in FIGS. 3-4) make it possible that the impulse-type of forces distribute more smoothly towards the lower base of the frame 9, and this also happens because the front shock absorbers 4 are made lengthier than in prior art; this characteristic is illustrated especially in FIGS. 3-4 and 7-8. In summary, FIG. 5 shows one of the most optimal locations, where the rear connection point 13 (or actually two of them) is desired to be placed, in order to enable proper shock absorbing properties and also long-term endurance of the vehicle in case of driving the snowmobile 1 in rough terrain.

Figure 6:
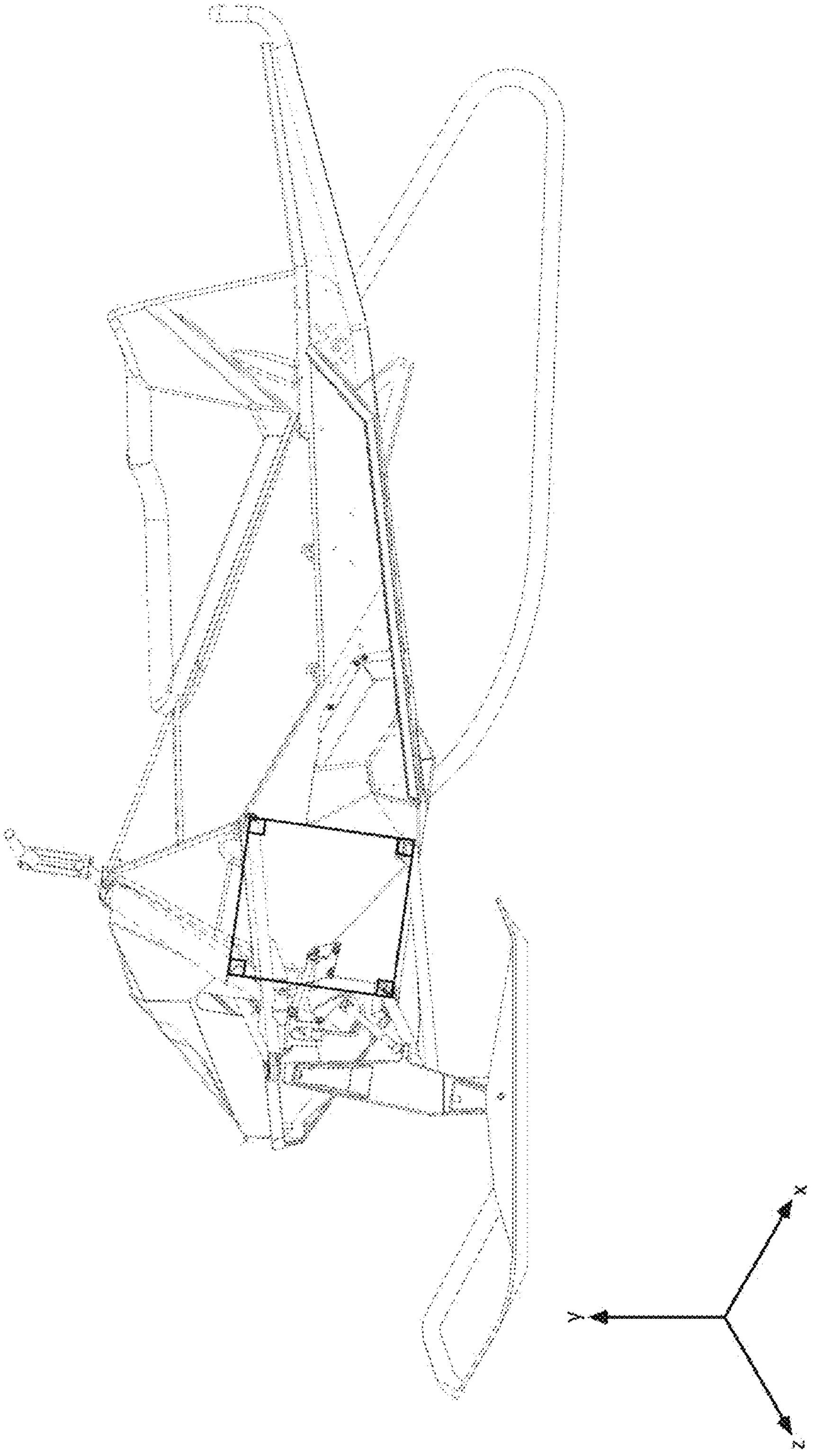
FIG. 6 illustrates a direct side view from the electric snowmobile, in an embodiment of the present invention.

FIG. 6 illustrates a direct side view from the electric snowmobile 1, in an embodiment of the present invention. The front skis, the lower suspension A-arm, the front shock absorber, the spindle and the handle bar can especially be seen in the left hand (i.e. front) side of the frame of the electric snowmobile 1. Some covering structures and an encapsulating body can be also seen, where the driver's seat may be attached on top of the horizontal section of the encapsulating body. The central volume within the encapsulating body is meant for the battery package, and when applying "pouch cells"-based battery modules, the battery package will accommodate a hexahedronal space within the volume determined by the outer surfaces of the encapsulating body.

The tail end part also may also define a planar area between the bottom surface of the battery package and the endless drive track locating within the roller tunnel. The endless drive track usually involves protrusional shapes in order to make better contact with the snow during the riding in various different terrains.

An important design feature of the present invention is illustrated in FIG. 6; namely the mutual positioning of the lower and upper suspension A-arms 6, 5. As shown with 90 degrees angles between different lines connecting four crucial connection points, the design thus involves the upper suspension A-arm 5 directly on top of the lower suspension A-arm 6. In other words, the upper and lower suspension A-arms have the same geometry, and alignment angles, i.e. thus locating directly as one on top of the other. Furthermore, the plane defined by the lower suspension A-arm 6 is parallel with the plane defined by the upper suspension A-arm 5. This parallelness will maintain all the time with any compression length activated with the front shock absorbers during driving. This has also the advantage that the driving posture will maintain pretty much the same, or at least as stable as possible, during bumpy driving, because the caster and camber angles (we define these later in more detail) of the snowmobile will remain practically the same all the time, no matter how much and how long the front shock absorbers are in a compressed state during the driving.

From these design features, it becomes clear that the four relevant "node" locations within the snowmobile's frame structure are indeed connected by imaginative lines, which form four 90 degrees angles between one another, as FIG. 6 shows.

Figure 7:
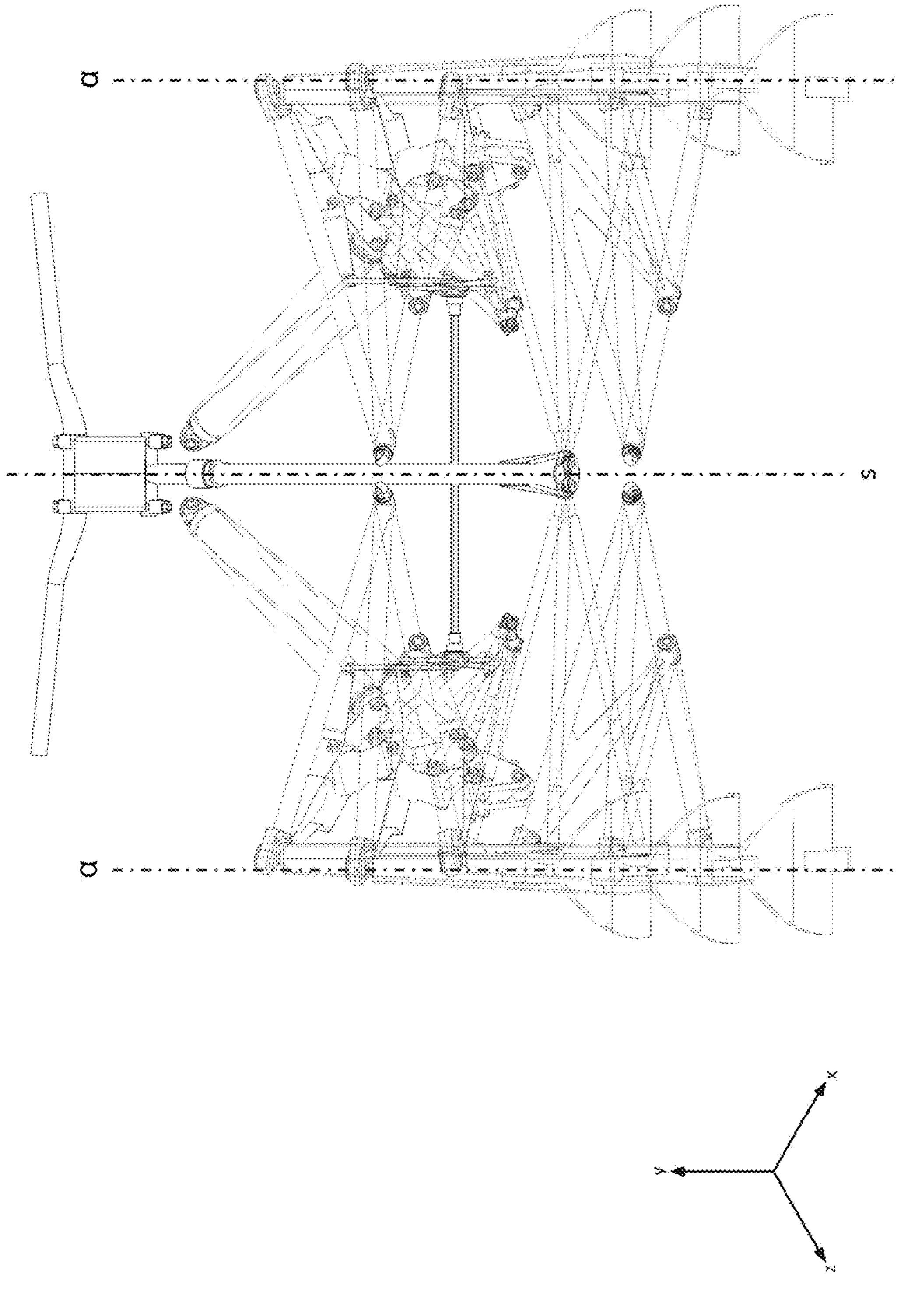
FIG. 7 illustrates the compression action made possible by the front shock absorbers, as a front view of the electric snowmobile.
Figure 8:
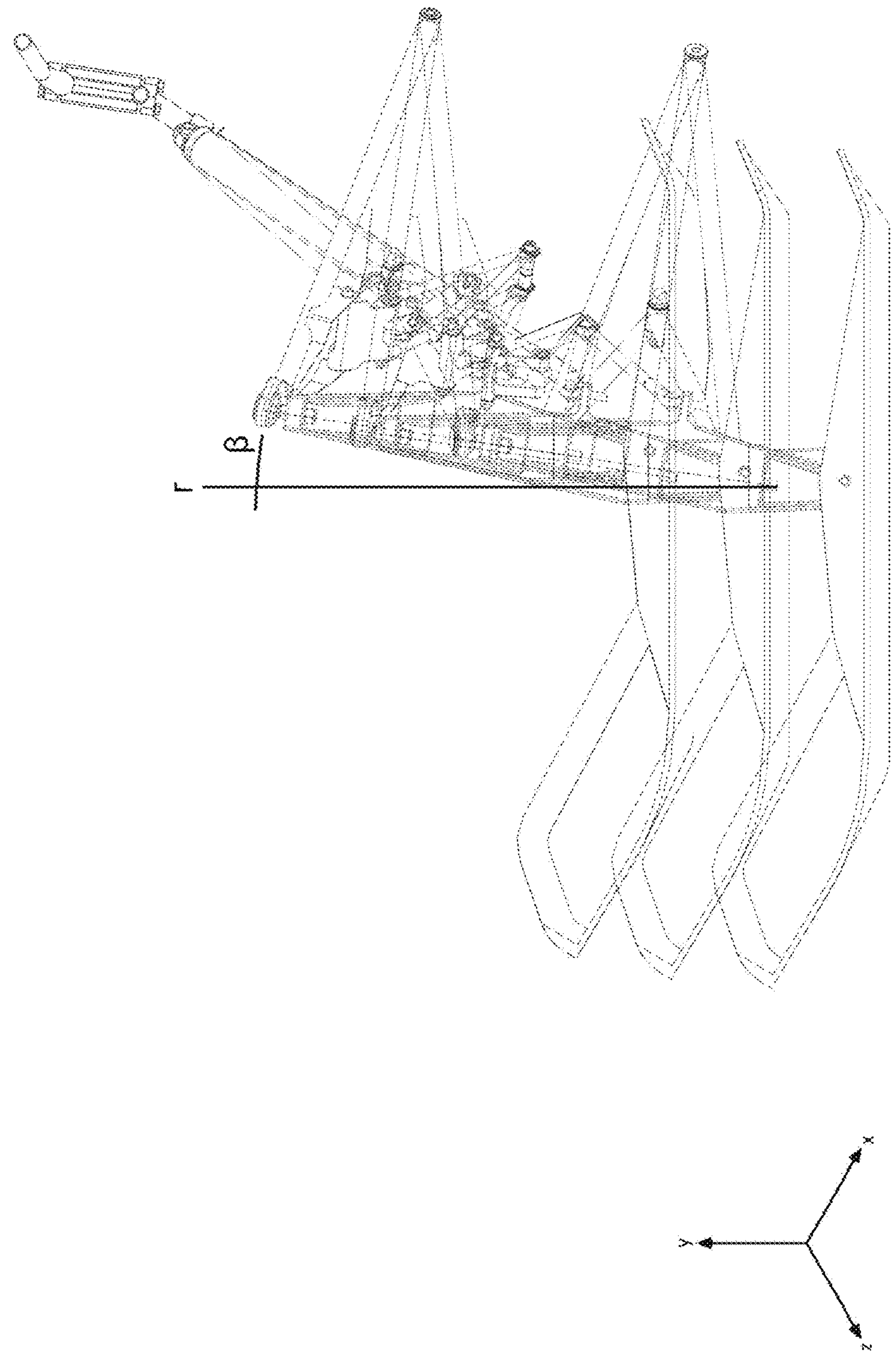
FIG. 8 illustrates the compression action made possible by the front shock absorbers, as a side view of the electric snowmobile.

The front shock absorbers 4, and the upper and lower suspension A-arms 5, 6 in the compressed situation in three different compression magnitudes are exemplified next in FIGS. 7 and 8. Also the camber and the caster angles of the snowmobile 1 are discussed in more detail.

FIG. 7 illustrates the compression action made possible by the front shock absorbers 4, as a front view of the electric snowmobile 1. In this embodiment, the two front shock absorbers 4 are connected to the frame 9 so that the upper ends of both front shock absorbers 4 are supported by the top location of the pyramid-shaped structure in the front side of the frame 9. This can be seen in FIG. 7, where the top ends of the front shock absorbers 4 are connected in practice to the same support point within the frame structure; i.e. right below the handle bar. This support point locates along the longitudinal centre line of the snowmobile 1, marked with dashed-dotted line "s" in FIG. 7. Naturally, also the handle bar locates symmetrically in view of the longitudinal centre line, to create a balanced snowmobile 1. A steering column is the axial element extending right below from the support point and the handle bar, right along the marking "s".

Now FIG. 7 illustrates three different snowmobile positions (i.e. intrinsically within its own frame), where the amount of compression within the front shock absorbers 4 varies in three different ways. These positions can be seen in FIG. 7 as examples, by a first neutral position, by a second half-compressed position and by a third fully-compressed position.

In the present embodiment, the upper suspension A-arm 5 has the same geometry as the lower suspension A-arm 6. Furthermore, the mirroring axis of the branches within the upper suspension A-arm 5 is parallel with the mirroring axis of the branches within the lower suspension A-arm 6. The upper and lower suspension A-arms 5, 6 locate in practice directly on top or approximately on top of one another, with parallel mirroring axis directions. Furthermore, both A-arms 5, 6 locate at the same distance from the vertically locating plane where the plane locates along the longitudinal central line of the snowmobile 1 (the vertical plane dividing the vehicle in symmetrical halves). In an embodiment, these positional characteristics of the upper and lower suspension A-arms 5, 6 apply in all compression magnitudes of the front shock absorbers 4, exemplified by three positions of the front part of the frame 9, as shown in FIGS. 7 and 8.

The above mentioned positional characteristics make it possible to obtain a constant or essentially constant camber angle ($\alpha$) in relation to the above defined vertical plane, across the whole compression or movement range of the front shock absorbers 4 (the top part of the frame moving along the axis "s"; with "moving" we mean an "oscillating" movement downwards and upwards in view of the level of the front skis).

FIG. 8 illustrates the compression action made possible by the front shock absorbers 4, as a side view of the electric snowmobile 1. This describes the same action and functionality as FIG. 7, but from a different angle.

Also FIG. 8 illustrates three different snowmobile positions (i.e. intrinsically within its own frame), where the amount of compression within the front shock absorbers 4 varies in three different ways. These positions can be seen also in FIG. 8 as examples, by a first neutral position, by a second half-compressed position and by a third fully-compressed position.

Also the caster angle ($\beta$) shown in FIG. 8 may be kept as constant or as essentially constant in relation to a lateral vertical plane across the snowmobile 1 (shown as a vertical plane or line "r" across the area where the skis locate); this also applies across the whole compression or movement range of the front shock absorbers 4 (three positions also shown in FIG. 8, as an example).

As can be seen from FIGS. 7-8, the upper suspension A-arm 5 locates in greater distance from the lower suspension A-arm 6, than in prior art solutions. This enables the front shock absorber's 4 length to be greater, which make it possible to obtain a greater compression range. This makes the shock absorbance properties better in very varying terrains and environments. The greater mutual distance between A-arms 5, 6 also make it possible to design a longer spindle 7. With a long spindle 7, the upper suspension A-arm 5 and the frame 9 will experience smaller impulses and forces than in prior art solutions applying a short spindle. A longer spindle or longer front shock absorbers are not possible in prior art solutions applying an internal combustion engine, because those engines, the required variable ratio transmission system and the gas exchange systems (e.g. pipes for exhaust gases) require large spaces which in the present invention is indeed used by the presented support structures at least partly. Therefore, the present technique in the traditional internal combustion engine-based snowmobiles does not allow the A-arms, other supporting elements and the shock absorbers to be designed in the way, which we have disclosed in connection with the present invention above, across its various embodiments.

The advantage of the functional efficiency in the front shock absorbers 4 because of the bigger space in the electric snowmobile's design, is that the bigger space enables using a longer structure in the front shock absorbers 4 together with the upper and lower suspension A-arms 5, 6. This structure creates very efficient shock absorbance properties in case of severe bumps faced along the driving of the snowmobile 1 in hard (i.e. varying) terrain. In prior art, the possible length of the front shock absorbers is much shorter because there is restricted space in the area where the front shock absorbers must be placed. Therefore, the shock absorbance properties in prior art snowmobiles are notably poorer.

Proper materials suitable for the encapsulating body 2 and for the various rods of the support structure, and for the suspension A-arms 5, 6, for the spindle 7, and also for the front shock absorbers 4 (concerning the solid parts forming the pipe-like parts) applied in the frame 9 comprise aluminium, steel, stainless steel, carbon fiber, and composite materials in general. One or several from these materials may be selected when manufacturing the frame structure of the snowmobile 1. These materials act also as an electromagnetic interference (i.e. EMI) protection means for the electric snowmobile 1.

The present invention may vary within the scope of the claims.

The invention claimed is:

1. An electric snowmobile with efficient shock absorbance properties, wherein the electric snowmobile comprises:

two skis at a front side of the electric snowmobile;

an endless drive track, and a roller tunnel for the endless drive track;

a camber angle (α) and a caster angle (β) as intrinsic parameters of the electric snowmobile;

a frame, comprising a front part of the frame, wherein the front part of the frame comprises:

two upper suspension A-arms and two lower suspension A-arms;

wherein, the upper and the lower suspension A-arms locate substantially on top of one another with a mutual distance, with mutually parallel mirroring angles of the A-arms, for each pair of upper and lower suspension A-arms for each of the skis, and the electric snowmobile further comprising:

front shock absorbers having top connection points locate adjacently, and substantially on a top of a substantially pyramid-shaped structure of the front part of the frame, wherein:

a rear connection point for the lower suspension A-arm in both the left and right sides locates at or right next to a longitudinal side edge of the roller tunnel, and further, the rear connection point for the lower suspension A-arm in both the left and right sides locates at or close to a lateral vertical plane along a front end of the roller tunnel; and the frame comprising a triangular forming so that impacts through the lower suspension A-arms to the frame are partly carried by the triangular forming of the frame.

2. The electric snowmobile according to claim 1, wherein the front part of the frame comprises a spindle per each ski, wherein the spindle is a vertical element connected to each of the skis, and wherein each A-arm is fixed to the spindle in a location where two rods forming an A-arm are connected to one another, and the upper and lower suspension A-arms are attached to different heights along the spindle, respectively for both spindles.

3. The electric snowmobile according to claim 1, wherein:

the upper left suspension A-arm is fixed to a top of the left spindle, the lower left suspension A-arm is fixed to the left spindle so that a mutual distance is larger than a distance from the lower left suspension A-arm's fixation point with the left spindle to a bottom surface of the left ski, and the upper right suspension A-arm is fixed to a top of the right spindle, the lower right suspension A-arm is fixed to the right spindle so that a mutual distance is larger than a distance from the lower right suspension A-arm's fixation point with the right spindle to a bottom surface of the right ski.

4. The electric snowmobile according to claim 1, wherein the frame is configured so that:

determining four end points including two outer ends in each of the upper and lower suspension A-arms in the left side of the snowmobile, designing the locations of the four end points so that the four end points define together corners of a rectangle, determining further four end points including the two outer ends in each of the upper and lower suspension A-arms in the right side of the snowmobile designing the locations of the further four end points so that the further four end points define together corners of another rectangle.

5. The electric snowmobile according to claim 1, wherein the snowmobile is configured to obtain a constant or essentially substantially constant camber angle in relation to a longitudinally extending vertical plane across a whole compression or movement range of the front shock absorbers, wherein the longitudinally extending vertical plane locates along a longitudinal central line of the snowmobile.

6. The electric snowmobile according to claim 1, wherein the snowmobile is configured to obtain a constant or essentially substantially constant caster angle in relation to a transversally extending vertical plane across a whole compression or movement range of the front shock absorbers, wherein the transversally extending vertical plane locates across the locations of the snowmobile where the skis are attached to a respective spindle.

7. The electric snowmobile according to claim 1, wherein the electric snowmobile comprises:

an encapsulating body, comprising a part having a hexahedronally shaped inner surface;

a driver's seat directly installed on top of a central horizontal part of the encapsulating body;

a battery package in the hexahedronally shaped inner space defined by the part of the encapsulating body; and one or more vibration isolators configured between the battery package and the encapsulating body, for diminishing effects from outer shocks towards the battery package.

* * * * *